United States Patent
Borgerink et al.

(10) Patent No.: US 9,950,299 B2
(45) Date of Patent: Apr. 24, 2018

(54) APPARATUS AND PROCESS FOR THE SEPARATION OF A PARTICULATE MATTER FROM A FLUID

(75) Inventors: Rob Borgerink, Albergen (NL); Derk Rudolf Journeé, Delden (NL); Robert Martinua Van Opdorp, Amsterdam (NL); Bastiaan Blankert, Enschede (NL)

(73) Assignee: X-Flow B.V., Enschede (NL)

( * ) Notice: Subject to any disclaimer, the term of this patent is extended or adjusted under 35 U.S.C. 154(b) by 1082 days.

(21) Appl. No.: 13/502,634

(22) PCT Filed: Oct. 19, 2010

(86) PCT No.: PCT/NL2010/050692
§ 371 (c)(1),
(2), (4) Date: Jul. 16, 2012

(87) PCT Pub. No.: WO2011/049441
PCT Pub. Date: Apr. 28, 2011

(65) Prior Publication Data
US 2012/0267326 A1    Oct. 25, 2012

(30) Foreign Application Priority Data
Oct. 19, 2009    (NL) .................................... 2003669

(51) Int. Cl.
*B01D 29/88*    (2006.01)
*B01D 35/30*    (2006.01)
(Continued)

(52) U.S. Cl.
CPC .......... *B01D 65/00* (2013.01); *B01D 2313/10* (2013.01); *B01D 2313/12* (2013.01); *B01D 2313/20* (2013.01)

(58) Field of Classification Search
CPC .......................... B01D 65/00; B01D 2313/12; B01D 2313/10; B01D 2313/20; B01D 63/046; B01D 63/04
See application file for complete search history.

(56) References Cited

U.S. PATENT DOCUMENTS

| | | | | |
|---|---|---|---|---|
| 3,505,215 A | * | 4/1970 | Bray | ................... B01D 61/025 |
| | | | | 210/138 |
| 4,016,078 A | * | 4/1977 | Clark | ..................... B01D 63/06 |
| | | | | 210/321.9 |

(Continued)

FOREIGN PATENT DOCUMENTS

| | | | |
|---|---|---|---|
| EP | 1743690 A1 * | 1/2007 | ............. B01D 63/04 |
| EP | 1743690 A1 | 1/2007 | |

(Continued)

OTHER PUBLICATIONS

Oxford Dictionary ("Concise Oxford Dictionary," 10th ed., ed. Judy Pearsall, pub. Oxford University Press, New York, 1999, definition of "reservoir," 4 pages).*

(Continued)

*Primary Examiner* — Bobby Ramdhanie
*Assistant Examiner* — Denise R Anderson
(74) *Attorney, Agent, or Firm* — Kinney & Lange, P.A.

(57) ABSTRACT

The invention relates to an apparatus and a process for the treatment of an incoming fluid, comprising: a bottom part connecting a common feed stream to individual membrane filter modules through a tailor made connecting piece; a top part connecting individual membrane filter modules to a common retentate stream through a tailor made connecting piece. According to the invention the apparatus is assembled out of tailor-made parts with the object to reduce material costs and labor costs, and the part are made such that footprint of the contraption is minimized. Furthermore, the individual parts form a sub-unit with such dimensions that (Continued)

multiple sub-units can be combined into one main unit, without the need to execute any alterations to the sub-units in terms of sizing, by which means modularity and scalability is introduced into the main units.

11 Claims, 5 Drawing Sheets

(51) Int. Cl.
    *B01D 37/00*     (2006.01)
    *B01D 65/00*     (2006.01)

(56) References Cited

U.S. PATENT DOCUMENTS

| | | | | |
|---|---|---|---|---|
| 4,988,445 A | * | 1/1991 | Fulk, Jr. | 210/652 |
| 5,194,149 A | * | 3/1993 | Selbie et al. | 210/232 |
| 5,405,528 A | | 4/1995 | Selbie | |
| 2004/0188339 A1 | * | 9/2004 | Murkute | B01D 61/18 210/321.8 |
| 2004/0238431 A1 | * | 12/2004 | Johnson | B01D 63/02 210/321.69 |
| 2006/0186032 A1 | | 8/2006 | Camilli et al. | |
| 2007/0007214 A1 | * | 1/2007 | Zha et al. | 210/718 |
| 2007/0102339 A1 | * | 5/2007 | Cote | B01D 61/18 210/321.69 |

FOREIGN PATENT DOCUMENTS

| | | | | |
|---|---|---|---|---|
| FR | 2912321 A1 | * | 8/2008 | B01D 61/18 |
| FR | 2912321 A1 | | 8/2008 | |
| WO | 9104783 A1 | | 4/1991 | |

OTHER PUBLICATIONS

Written Opinion of the International Searching Authority in Application No. PCT/NL2010/050692, dated Mar. 15, 2011.

\* cited by examiner

APPARATUS AND PROCESS FOR THE SEPARATION OF A PARTICULATE MATTER FROM A FLUID

The invention relates to an apparatus and process for the separation of particulate matter from a fluid, comprising membrane filter modules with their surrounding structure which functions both as a supporting structure for the membrane filter modules and as a means to channel the different process streams to and from the membrane filter modules.

Such an apparatus and process is known, for example, for purifying fluids and comprises a set of membrane filter modules that are incorporated into a process by means of a rack or a skid, in which the membrane filter modules are connected to common piping by means of headers. The rack or skid typically incorporates instruments for the measurement of process parameters and valves for the control of different process steps that are necessary to operate the membrane filter modules. The rack or skid in turn is connected to the main plant equipment such as tanks and pumps. The fluid to be treated is typically pumped into the rack or skids and through its headers the fluid is then distributed to the individual membrane filter modules. The fluid typically passes the membrane filters, while the particulate matter is retained onto the membrane surface. The clean, treated fluid is once more collected in a header that connects the filtrate sides of the individual membrane filter modules. This header in turn delivers the treated fluid to the main plant equipment.

U.S. Pat. No. 5,405,528 describes a micro porous, modular filter structure assembled from replaceable filter cartridges, housed within a filter cartridge assembly, connected at opposite ends by means of symmetrical headers.

US 2006/0186032 describes a fluid processing system with at least one module comprising a frame and at least two housings, each housing having an interior configured to contain at least one fluid separation element; and at least one plumbing assembly with connection ports to connect in fluid communication with the interiors of the at least two housings in a first an a second orientation.

EP 1 743 690 describes a filter installation with a plurality of vertical filtration modules arranged in rows. At both ends of the filtration modules a feed is mounted that via an individual branche connects to a common feeding tube. A frame supports and holds the structure in a vertical position.

WO 91/04783 describes a manifold structure for connecting rows of filter cartridges to adjacent rows of filter cartridges. Each filter cartridge is at both ends connected to a header, the headers in a row are connectable to each other and at both ends of arrow the last header is connectable to a manifold that in turn is connectable to a manifold of a next row of filter cartridges.

FR 2 912 321 describes an assembly of vertically arranged filter modules on a rack, where along the top and along the bottom of the assembly a pipe is running and where each of the modules at both the top end and the bottom end is connected to a connecting tube that ends in the respective pipe.

The common disadvantage of the filter assemblies described above is that each filter unit is equipped with individual connection parts to feeding and discharge pipes. Although this may function very well, the individual fitting of these connection parts is time consuming, labour intensive and costly.

Within the state of the art as described above it is disadvantageous that every single piece of material within the skid or rack typically has only one function e.g. either a support function (i.e. a piece of frame) or a transport function (i.e. a piece of pipe). A second disadvantage is that a skid is usually constructed by means of welding or bolting piping together and membrane filter modules are typically connected by means of of-the-shelf couplings. This results in a contraption that is expensive in terms of material and in terms of the labour associated with its manufacturing. A third disadvantage is that the space that a rack or skid takes up is relatively large, since using standard parts means that for example the distance between individual membrane filter modules cannot be chosen freely, but depends on the size and shape of standard available pieces of pipe, bends, couplings etc. As such, the rack or skid has a larger footprint and volume than strictly necessary. A fourth disadvantage is that the sizing of piping in particular is usually tailored to a certain fixed number of membrane filter modules. A different number of membrane filter modules require a different size of the associated piping, making it quite cumbersome to define a standardized range of skid or rack sizes.

It is the object of the present invention to overcome the aforementioned drawbacks and to provide a suitable alternative. In particular, it is the object of the present invention to use non standard parts and materials, in order to (1) give a single part multiple functions, (2) to reduce the footprint and volume significantly compared to the state of the art and (3) to decrease material and labour costs by designing parts in such a way that assembly is fast and reliable. It is also the object of the present invention to (4) devise a modular system, in which identical subunits can be simply interconnected to form one main unit, without having to change any pipe size. Connecting the sub-units may be done by means of a state of the art bolted flange connection or (5) by means of a self-sealing male-female connection.

In order to achieve the above objects the present invention provides an apparatus and a process for the treatment of an incoming fluid, comprising a bottom part connecting a common feed stream to individual membrane filter modules through a tailor made connecting piece; a top part connecting individual membrane filter modules to a common retentate stream trough a tailor made connecting piece, wherein the apparatus is assembled out of tailor-made parts with the object to reduce material costs and labor costs, the parts are made such that footprint of the contraption is minimized, the individual parts form a subunit with such dimensions that multiple sub-units can be combined into one main unit, without the need to execute any alterations to the sub-units in terms of sizing, by which means modularity and scalability is introduced into the main units.

Preferably the top and bottom parts of the apparatus are made by means of rotation moulding.

Preferably the connecting pieces are made by means of injection moulding.

Furthermore the invention relates to a process for the treatment of an incoming fluid by the use of the apparatus according to the invention. The apparatus in this case utilizes a limited amount of custom made building blocks that together comprise a single sub-unit. The sub-units are in turn combined into a single main unit. Multiple main units form a treatment plant.

A sub-unit collects the individual membrane filter module connections. A membrane filter module typically has two, three or four connections e.g. a feed connection, a retentate connection, a permeate connection. The sub-unit combines all membrane filter module feed connections into on common sub-unit feed connection. The same is applicable to the other membrane filter module connections.

A sub-unit consists of a limited amount of tailor made and specialized parts, most of which have multiple functions.

The bottom part feeds the individual membrane filter modules. This part connects a number of membrane filter modules and is responsible for the equal distribution of the fluid to be treated across the individual membrane filter modules. The bottom part has an entrance and an exit. These connections may either be identical bolted flange connections or they may be a male and female type connection with integrated seal, eliminating the need to bolt the parts together. The connections are used to either be coupled to another bottom part, or they can be closed of or they can be connected to a main plant feed line. One sub-unit may consist of one or multiple bottom parts. The bottom part is formed in such a way, preferably by means of rotation moulding, that additional piping, possibly of a different material, can be integrated into the bottom part. In some embodiments of this invention, the membrane filter modules are not only fed by the fluid to be treated, but a mixture of the fluid and a gas, typically but not exclusively air, is fed to the membrane filter modules in order to minimize fouling. All embodiments incorporate filtered fluid extraction of the membrane filter modules, either at the bottom or the top of said modules. In case filtered fluid extraction is executed at the bottom, there are three streams that need to be accommodated from the bottom of the membrane filter modules i.e. a feed stream of fluid to be treated, a gas stream that is added to the feed stream resulting into a feed-stream/gas mixture and a filtered fluid stream that is extracted. The first stream is catered for by the bottom part, the latter two streams are handled by the aforementioned additional piping.

The connection from the membrane filter modules to the bottom part and the piping is handled by another tailor made connecting piece, consisting of one or more dedicated parts. This piece, preferably made by means of injection molding, also has multiple functionalities i.e. (1) connecting the feed side of the membrane filter modules to the bottom part, (2) delivering the gas stream from the additional piping into the stream of the fluid to be treated of an individual membrane filter module and optionally (3) connecting the treated fluid extraction connection of a single membrane filter module to the central treated fluid piping of a sub-unit.

The top part is formed preferably by means of rotation molding. The top part may be constructed of one or two individual parts, which combine the retentate connections of individual membrane filter modules into a single retentate stream. Similar to the bottom parts, the top parts incorporate an entrance and an exit. These connections may either be identical bolted flange connections or they may be a male and female type connection, with integrated seal, eliminating the need to bolt the parts together. The connections are used to either be coupled to another top part, or they can be closed of or they can be connected to a main plant retentate line. One sub-unit may consist of one or multiple top parts.

The invention is explained in more detail with reference to the following drawings.

Figure 1:
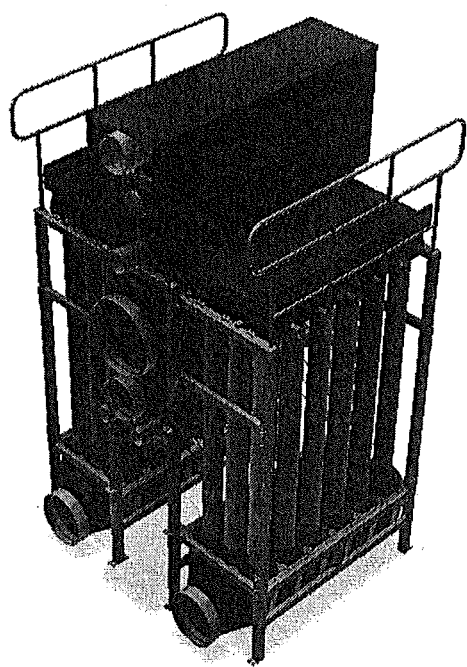
FIG. 1 shows an artist rendering of said sub-unit

In FIG. 1, an artistic rendering of a single sub-unit is shown.

Figure 2:
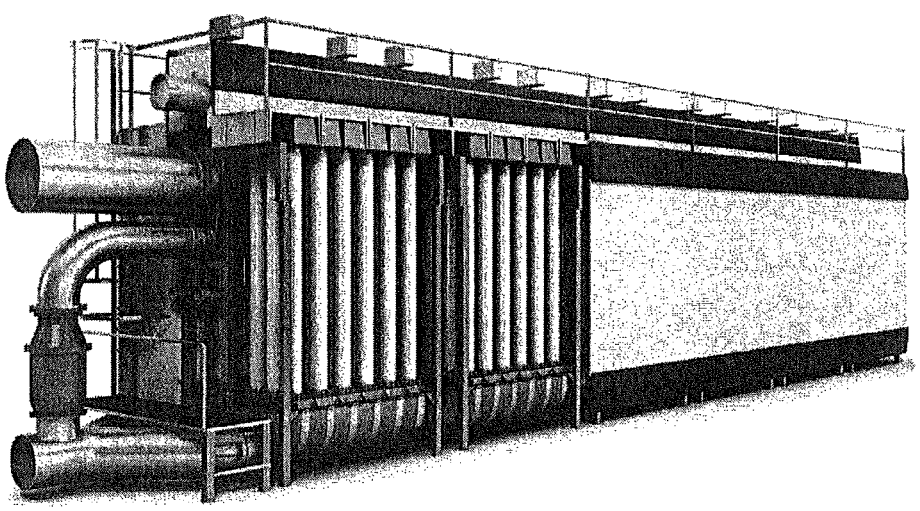
FIG. 2 shows an artist rendering of a single unit consisting of six sub-units

FIG. 2 shows an artistic rendering of six sub-units, interconnected into one unit. The unit is connected to the main equipment by means of the piping at the front of the unit.

Figure 3:
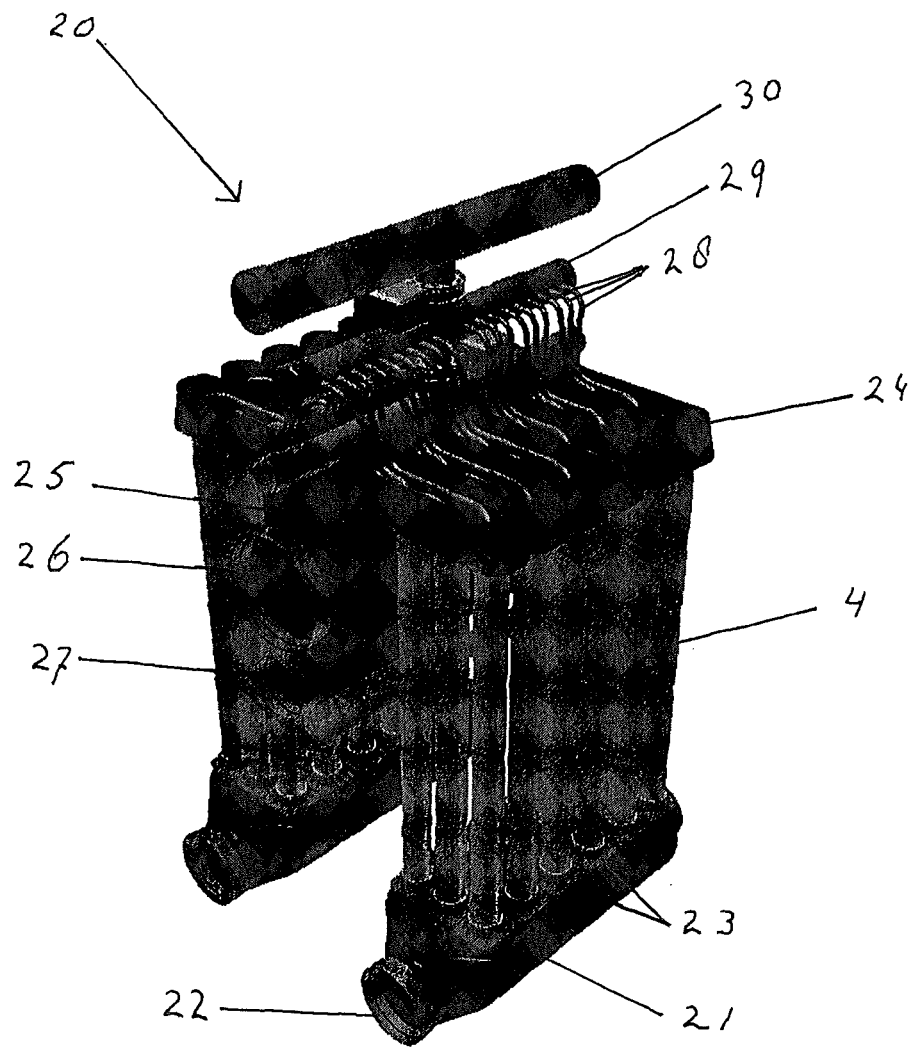
FIG. 3 shows a diagrammatic view of a embodiment of a single sub-unit according to the invention
Figure 4:
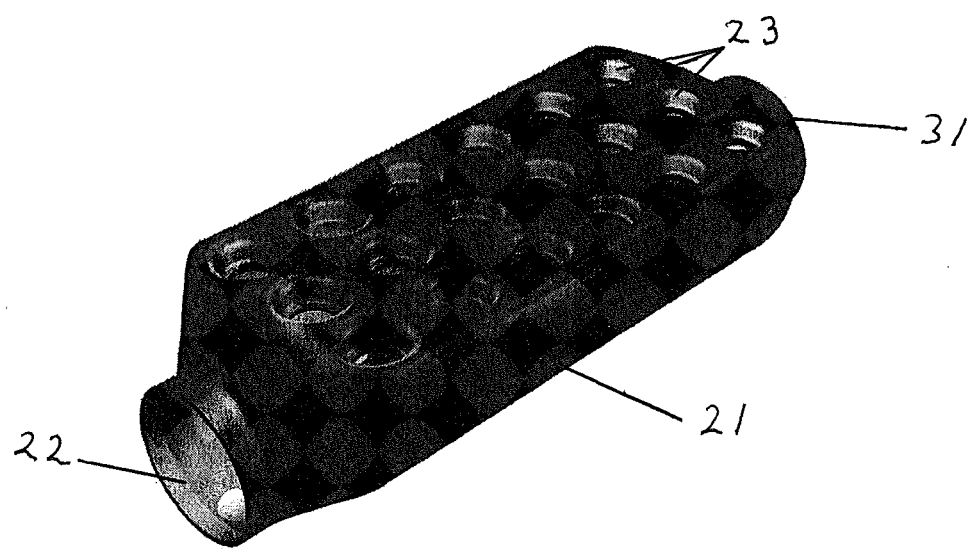
FIG. 4 shows a closed reservoir as a bottom part of a single unit of FIG. 3

FIG. 3 shows a diagrammatic view of a embodiment of a single sub-unit according to the invention. The sub-unit comprises two closed reservoirs 21 as bottom parts, of which only one has been indicated by the reference number, with one inlet opening 22 for feeding of fluid to be filtered, and each reservoir 21 comprising eighteen ports 23, also referred to as feeding ports, of which only two are indicated with the reference number, for connection with an inlet of a filter unit 4. The filter units 4 are with one end, also referred to as the first end, inserted in ports 23 for a male-female connection, the connection also comprising a sealing ring. The filter units 4 are arranged in three rows of six units. FIG. 4 shows reservoir 21 in more detail. Also shown in FIG. 4 is an outlet port 31 for connection to a reservoir of a following unit. If unit 20 is the last unit, outlet port 31 is closed.

Figure 5:
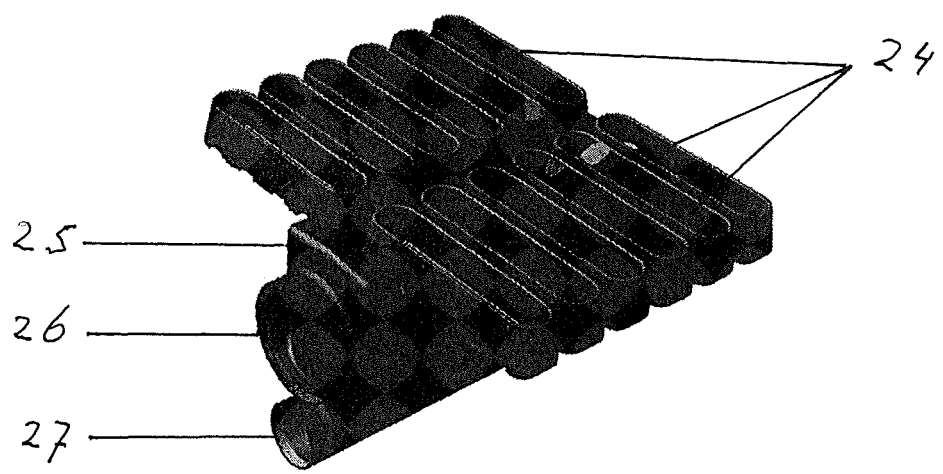
FIG. 5 shows a top part of a single unit of FIG. 3.

At the top side two rows of six reservoirs 24, also referred to as outlet reservoirs, of which only one is indicated with the reference number, are visible. Reservoirs 24 each are connected to the top side of three filter units 4 and collect remaining unfiltered fluid from the filter units 4 for discharging in outlet block 25 comprising outlet pipes 26, 27, also referred to as second outlet pipes. Outlet pipe 27 serving to discharge the fluid and in case the fluid was aerated, outlet pipe 26 serving to discharge the fluid for recycle purposes and possibly part of the aerating gas. The filter units 4 are with one end, also referred to as the second end, inserted in respective ports (also referred to as inlet ports) in reservoirs 24 for a male-female connection, the connection also comprising a sealing ring. FIG. 5 shows the two sets of six containers 24 and outlet block 25 with outlet pipes 26, 27 in more detail. It is also possible to fit filter units 4 at their inlet ports with aerating units if aeration is required.

The filter units 4 thus have an inlet at the first end for feeding fluid to be filtered and a second outlet opening at the second end for discharging remaining unfiltered fluid.

FIG. 3 also shows a first outlet pipe 30 for discharging the filtrate. Outlet pipe 30 is connected to intermediate container 29 that in turning this embodiment is connected to each of the filter units 4 by means of a filter outlet pipe 28. Thus, the filters 4 each have a first outlet opening at at least one of the second end and the first end for discharging filtered fluid.

In this arrangement according to the invention and that is described above, the filter units 4 are supported and held in position by reservoirs 21 and 24. This simplifies the construction of the unit considerable with respect to the state of the art where filter units 4 need separate frames to be supported and kept in position. Also connections for feeding the units with fluid and for discharging remaining unfiltered fluid and filtered fluid is simplified largely by the concept of the reservoirs 21, 24 according to the invention. The complicated and labour intensive to install and maintain individual connections to and from the filter units are no longer needed, thus reducing overall cost and installation time. Due to the modularity of the various parts costs can be even further reduced.

LIST OF REFERENCE NUMBERS 4 filter unit
20 sub-unit
21 feeding reservoir, bottom unit
22 inlet opening
23 feeding port 24 outlet reservoir
25 outlet block
26 outlet pipe
27 outlet pipe
28 filter outlet pipe
29 intermediate container
30 outlet pipe
31 outlet port

The invention claimed is:

1. A sub unit for filtering of a fluid, comprising:
multiple filter units in multiple rows of at least two filter units per row, each of the filter units comprising:
an inlet at a first end for feeding the fluid to be filtered,
a first outlet at at least one of a second end and the first end for discharging filtered fluid, and
a second outlet opening at the second end for discharging remaining unfiltered fluid;
a common sub-unit feed connection for feeding the fluid to be filtered to the multiple filter units, the common sub-unit feeding connection comprising:
a feeding pipe through which fluid to be filtered is fed; and
a closed feeding reservoir connected with one inlet opening to the feeding pipe, which feeding reservoir is connected to all of said multiple filter units and comprises multiple feeding ports, each feeding port connected to the inlet of one of the multiple filter units;
a first outlet pipe for the filtered fluid connected to the first outlet opening of each of the filter units
an outlet block for discharging the remaining unfiltered fluid comprising:
a second outlet pipe for discharging the remaining unfiltered fluid, connected to the second outlet opening of each of the filter units, and
multiple outlet reservoirs for collecting the remaining unfiltered fluid, each of the outlet reservoirs being connected to the second outlet pipe to which the remaining fluid to be filtered is discharged, and each of the outlet reservoirs comprising:
multiple inlet ports, each connected to the second outlet opening of one of the filter units;
wherein the filter units are supported and positioned parallel to each other, so that the first ends are positioned in a first common plane and the second ends are positioned in a second common plane.

2. Sub unit according to claim 1, wherein a first connection of the first outlet opening of each of the filter units to the first outlet pipe at least partly is positioned within the respective outlet reservoir of the outlet block.

3. Sub unit according to claim 2, wherein the first connection at least partly is positioned within the feeding reservoir.

4. Sub unit according to claim 1, wherein the feeding reservoir comprises an outlet opening port that is connected to an inlet opening port of a next feeding reservoir belonging to a next sub unit device.

5. Sub unit according to claim 1, wherein a feeding connection of between the feeding port and the filter unit and a second connection between the second outlet opening and the openings of the outlet reservoir outlet block comprises a male/female connection that comprises a sealing.

6. Sub unit according to claim 1, wherein a feeding connection between the feeding port and the filter unit and a second connection between the second outlet opening and the openings of the outlet reservoir outlet block comprises a flanged connection.

7. Sub unit according to claim 1, wherein the feeding reservoir comprises eighteen feeding ports, each feeding port connected to the inlet of one of the filter units.

8. Sub unit according to claim 7, wherein the feeding ports are arranged in six rows of three.

9. Sub unit according to claim 1, wherein at least one outlet reservoir outlet block comprises three inlet ports each connected to the second outlet opening of one of the filter units.

10. Sub unit according to claim 1, wherein each of the filter units comprises an aerator at the first end.

11. An apparatus for the separation of particulate matter from a fluid, comprising multiple sub unit devices, each of the sub unit devices comprising:
multiple filter units in multiple rows of at least two filter units per row, each of the filter units comprising:
an inlet at a first end for feeding fluid to be filtered,
a first outlet opening at at least one of a second end and the first end for discharging filtered fluid, and
a second outlet opening at the second end for discharging remaining unfiltered fluid;
a feeding device, common to the multiple filter units, for feeding the fluid to be filtered, the feeding device comprising:
a feeding pipe through which the fluid to be filtered is being fed, and
a closed feeding reservoir connected with one inlet opening to the feeding pipe, which feeding reservoir is connected to all of said multiple filter units and comprises multiple feeding ports, each feeding port connected to the inlet of one of the multiple filter units;
a first outlet pipe for the filtered fluid connected to the first outlet opening of each of the filter units; and
an outlet block for discharging the remaining unfiltered fluid, comprising:
a second outlet pipe for discharging the remaining unfiltered fluid, connected to the second outlet opening of each of the filter units, and
multiple outlet reservoirs for collecting the remaining unfiltered fluid, each of the outlet reservoirs comprising:
an outlet opening which is connected to the second outlet pipe and through which the remaining fluid to be filtered is discharged in the second outlet pipe and
multiple openings each connected to the second outlet opening of one of the filter units;
wherein the feeding reservoir and the outlet reservoirs support the filter units and position the filter units parallel to each other, so that the first ends are positioned in a first common plane and the second ends are positioned in a second common plane; and
wherein said multiple sub unit devices comprise a first sub unit device and a next sub unit device, and an outlet opening port of the feeding reservoir of the first sub unit device is connected to an inlet opening of a next feeding reservoir for fluid to be filtered belonging to the next sub unit device.

* * * * *